(12) United States Patent
Chey et al.

(10) Patent No.: US 7,130,141 B2
(45) Date of Patent: Oct. 31, 2006

(54) ASSEMBLY FOR THERMAL AND/OR THERMALLY-ASSISTED INFORMATION PROCESSING

(75) Inventors: S. Jay Chey, Ossining, NY (US); Hendrik F. Hamann, Mohegan Lake, NY (US); Martin Patrick O'Boyle, Cortlandt Manor, NY (US); H. Kumar Wickramasinghe, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 291 days.

(21) Appl. No.: 10/401,565

(22) Filed: Mar. 31, 2003

(65) Prior Publication Data

US 2004/0190175 A1    Sep. 30, 2004

(51) Int. Cl.
H05B 1/02    (2006.01)
G11B 5/02    (2006.01)

(52) U.S. Cl. .................. 360/59; 219/505; 219/216; 360/55

(58) Field of Classification Search ................ 219/497, 219/505, 121.43, 121.4, 121.41, 494, 501, 219/504, 216; 360/59, 66
See application file for complete search history.

(56) References Cited

U.S. PATENT DOCUMENTS

| 5,908,572 A * | 6/1999 | Nagumo et al. ............ 219/501 |
| 6,433,310 B1 | 8/2002 | Wickramasinghe et al. |
| 2002/0101673 A1 | 8/2002 | Wickramasinghe et al. |
| 2002/0101812 A1 | 8/2002 | Wickramasinghe et al. |
| 2003/0035234 A1 | 2/2003 | Coffey et al. |

* cited by examiner

*Primary Examiner*—Mark Paschall
(74) *Attorney, Agent, or Firm*—McGinn & Gibb, PLLC; Patrick Duncan; Steven J. Cahill (57) ABSTRACT

An information processing assembly includes at least one heater suitable for information processing, and a controller for controlling the at least one heater by at least one of adjusting a power to the at least one heater to match a target power level, and changing a polarity of an electrical current supplied to the heater.

24 Claims, 7 Drawing Sheets

ASSEMBLY FOR THERMAL AND/OR THERMALLY-ASSISTED INFORMATION PROCESSING

CROSS REFERENCE TO RELATED APPLICATIONS

This Application is related to U.S. patent application Ser. No. 09/773,346 filed on Jan. 31, 2001, entitled "An assembly suitable for reading/writing/erasing information based on thermal coupling", U.S. patent application Ser. No. 09/774,851 filed on Jan. 31, 2001, entitled "An assembly suitable for reading data based on thermal coupling", U.S. patent application Ser. No. 09/774,943 filed on Jan. 31, 2001, entitled "An assembly for writing and/or erasing high density data on a media", having U.S. patent application Ser. No. 09/773,323 filed on Jan. 31, 2001, entitled "A method for writing and/or erasing high density data on a media", having U.S. patent application Ser. No. 10/401,564 filed on Mar. 31, 2003, entitled "Thermal Memory Cell and Memory Device Including the Thermal Memory Cell", having U.S. patent application Ser. No. 10/401,564, entitled "Thermal Memory Cell and Memory Device Including the Thermal Memory Cell", U.S. Pat. No. 6,233,206 entitled "High Density Magnetic Thermal Recording and Reproducing Assembly", and U.S. Pat. No. 6,493,183 entitled "Thermally-assisted Magnetic Recording System with Head Having Resistive Heater in Write Gap", all of which are assigned to International Business Machines Corporation, and are incorporated herein by reference, and U.S. Pat. No. 5,991,113, entitled "Slider with Temperature Responsive Transducer Positioning", which is incorporated herein by reference.

BACKGROUND OF THE INVENTION

1. Field of the Invention

The present invention relates generally to an assembly for information processing and in particular to an assembly for thermal memory cells and chips and to an assembly for thermally-assisted magnetic information processing as well as thermal protrusion control. The assemblies include a heater and a controller for controlling the heater.

2. Description of the Related Art

One of the key challenges in any form of thermal and/or thermally-assisted information processing and control and/or thermally-induced protrusion control is to optimize the performance of the energy source (e.g., heater). For example, in a thermal memory cell/chip a heater is used to write and erase on a storage media. In some cases, for the purpose of reading, the same heater is utilized to measure the thermal impedance of the storage media. In other schemes of phase-change recording as described in the above-referenced related U. S. patent application Ser. Nos. 09/774,851, 09/774,943, 09/733,323, and 09/773,346, a heater in a head-like structure is used to realize thermal reading, writing and erasing.

As discussed, for example, in U.S. Pat. Nos. 6,233,206 and 6,493,183, thermally-assisted magnetic recording involves heating the storage media by transferring energy (i.e., heat) to the media from an energy source (e.g., a heater), which may be embedded in a recording head. The resulting temperature rise in the magnetic medium reduces its coercivity, which allows the use of harder, and therefore, higher density capable recording media. Without heating, the available magnetic field would be not sufficient to record the magnetic information patterns. More specifically, for a about 20% writeability improvement on a conventional longitudinal recording media (e.g., a coercivity of about 20 Oe/K) the media has to be heated up to about 80° C. by the heater element. Depending on various details such as the size of the heater (e.g., heating element) size, spin speed, media thermal and substrate thermal properties, heat flux between the recording head and disk etc., the heater has to be heated to about 300° C. or even more. As a final example, heaters in (magnetic) recording heads can be used to induce protrusion, which reduces a fly height (e.g., distance) between heater and recording media.

The most economic way of supplying energy to the heater includes Joule heating, in which electrical power is dissipated in the heater, causing an increase in the temperature of the heater (e.g., heating element). In order to simplify the discussion of the present invention, in the following it will be assumed that the resulting temperatures are linearly dependent on the dissipated power in the heater.

However, Joule heating is accompanied by several challenges because the heater has to last and maintain its properties for an extended period of time at these high temperatures (e.g. >1000 hours). Typical failure mechanisms besides dielectric breakdown and ESD, include oxidation, electro-migration, thermal breakdown and thermal stress.

In particular, electro-migration can be a real issue since the currents supplied to a small resistor heater are considerably close to current density limits. Specifically and as an example, for most moderate thermally-assisted magnetic recording with a heater cross-sectional area of $0.5 \times 0.03 \, \mu m^2$, heater length of 5 µm and a heater material of beta-Ta ($2 \times 10^{-6} \, \Omega m$) finite element modeling shows that 5 to 6 mA and 3 to 4 V are needed to heat the disk to 80° C., which corresponds to a current density of about $5 \times 10^7 A/cm^2$. Experimentally, it can be shown that at higher temperatures these current densities alter the resistance of the Ta-heater by about 0.5% /hour after 2 hours at 500° C.

The heater can often be operated in different modes. The two obvious modes include constant current and constant voltage DC-power supplies. However, both of these methods are only usable if the heater resistance is not altered significantly. For example, if a constant DC current is supplied to the heater and the heater resistance increases slowly, the dissipated power in the heater and consequently the temperature increases as well. Therefore, such a mode can very easily cause an "avalanche effect", which results into the failure of the heater (e.g., heating element).

On the other hand, if a constant DC voltage is supplied to the heater, the increased resistance will cause the current to decrease, which results into less power dissipated and thus, a lower temperature. Since the temperature of the heater has to be maintained and controlled precisely, the constant current (as well as the constant voltage) mode is not acceptable as long as the heater resistance changes. For example, experiments on the aforementioned Ta-heaters have shown that at a constant voltage, which corresponds to a temperature of 500° C., the resistance drops more than 20% in 12 hours, which means that at a constant voltage the temperature in the heater has come down by almost 100 K.

In summary, a good assembly design has two objectives: a) minimize heater resistance changes and b) control the power dissipated in the heater and thus control the temperature of the heater. However, conventional controllers and assemblies do not effectively address these objectives.

SUMMARY OF THE INVENTION

In view of the foregoing problems and disadvantages associated with conventional assemblies, it is a purpose of the present invention to provide an assembly for thermal and/or thermally-assisted information processing (e.g., thermally-assisted recording (TAR) and thermally-induced protrusion (TIP)) which may minimize heater resistance changes and control the power dissipated in the heater and thus control the temperature of the heater.

The present invention includes an information processing assembly which includes at least one heater suitable for information processing (e.g., for generating thermal energy), and a controller for controlling the at least one heater. The controller controls at least one of a power to said heater which is adjusted to match a target power level, and a polarity of an electrical current supplied to the heater. For example, the polarity may be changed by the controller at an appropriate time which may be determined by a rate of electromigration (e.g., in the heating element of the heater). For example, the controller may include a resistor having a resistance which is about equal to a resistance of the heater, an analog feedback loop, and digital feedback loop.

Specifically, the controller may control the at least one heater to at least one of inhibit and compensate for a variation in electrical resistance in the heater. The variation in electrical resistance may include, for example, an electromigration-induced variation, a chemically-induced variation, and a change in a grain structure of a material in the heater The assembly may further include a storage medium having at least one of a programmable thermal impedance and a programmable electrical impedance. Further, the thermal energy may program the at least one of the programmable thermal impedance and the programmable electrical impedance. In that case, power to the heater (e.g., at least one heater) may be adusted to match a target power level which is determined by one of whether information is read, erased or written, a value to which the thermal impedance and/or electrical is programed, and a storage media temperature.

In addition, the assembly may include a head-like structure (e.g., a magnetic recording head) for processing information on a magnetic recording medium, the at least one heater being disposed in the magnetic recording head. In that case, the thermal energy may induce a thermal protrusion in the magnetic recording head, and/or heat (e.g., generate a heat spot on) the magnetic recording medium. Further, the at least one heater may include a first heater for inducing a thermal protrusion in the magnetic recording head and a second heater for heating (e.g., generating a heat spot on) the magnetic recording medium. Further, the target power level may be based on at least one of a temperature of the magnetic recording media, a fly height between the magnetic recording head and the magnetic recording medium, and a spin speed of the magnetic recording medium.

Further, the magnetic recording head may also include a write coil. In that case, the target power level may be based on a heating from the write coil. In addition, the polarity may be synchronized with a write coil current.

The present invention also includes a controller for controlling a heater in an information processing assembly. The inventive controller includes an input for receiving a signal including information for controlling at least one of a power to the heater which is adjusted to match a target power level, and a polarity of an electrical current supplied to the heater. The controller may also include a processor which may determining a target power level, and a control circuit which receives a signal from the processor. For example, the information may include ambient temperature, a temperature of a recording head in which the heater is disposed, a spin speed of a storage media, a fly height between the recording head and the storage media, an information processing command and a heater resistance of the heater.

The controller may also include a voltage source for supplying power to the heater; a current sensor coupled to the voltage source, and a feedback circuit. In another example, the controller may include a current source for supplying power to the heater, a voltage sensor coupled to the current source, and a feedback circuit.

The present invention also includes an inventive method of controlling at least one heater in an information processing assembly. The method includes at least one of adjusting a power to the at least one heater to match a target power level, and changing the polarity of an electrical current supplied to the at least one heater.

The present invention also includes a novel disk drive which includes the inventive assembly, a spindle for rotating a magnetic disk, and an arm comprising the read/write head, for selectively locating the read/write head over the magnetic disk, the at least one heater being formed in the read/write head.

The present invention also includes a programmable storage medium tangibly embodying a program of machine-readable instructions executable by a digital processing apparatus to perform the inventive method.

With its unique and novel features, the present invention provides an effective assembly for thermal and/or thermally-assisted information processing (e.g., thermally-assisted recording (TAR) and thermally-induced protrusion (TIP)) which may minimize heater resistance changes and control the power dissipated in the heater and thus control the temperature of the heater.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
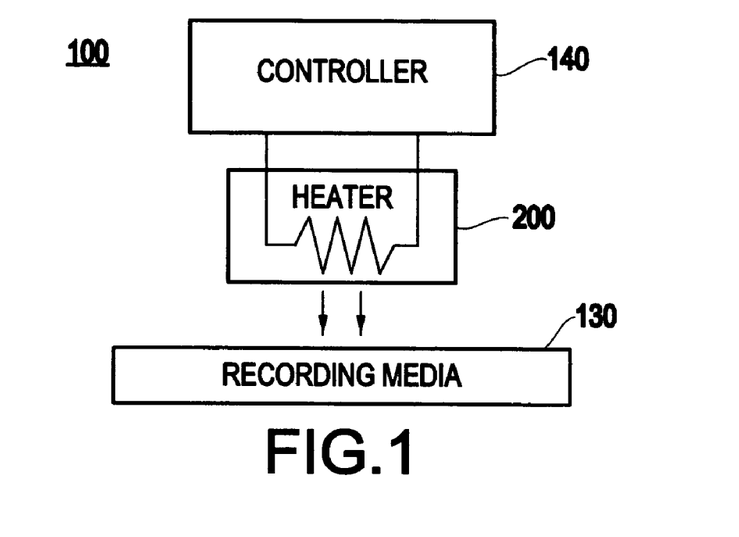
FIG. 1 illustrates an inventive assembly 100 for thermal and/or thermally-assisted information processing according to present invention.

Referring now to the drawings, and more particularly to FIG. 1, the present invention includes an inventive assembly 100 for thermal and/or thermally-assisted information processing (e.g., using a thermal memory chip/cell, phase-change recording apparatus, thermally-assisted magnetic recording (TAR) and thermally-induced protrusion (TIP) apparatus).

The assembly 100 includes a heater 200, which may be used for thermal and/or thermally-assisted information process and control. This heater 200 may be part of a thermal memory cell (e.g., as discussed in the related U.S. patent application Ser. No. 10/401,564). In that case the heater 200 is used to program (i.e., to write and/or erase) the thermal and/or electrical impedance of a storage media 130 (e.g., phase-change media such chalcagonides).

Further, the heater 200 may be part of a thermal recording apparatus, where the heater 200 is arranged in a head-like structure. As discussed in the above-referenced related patent applications (e.g., U.S. patent application Ser. Nos. 09/774,851, 09/774,943, 09/733,323, and 09/773,346, the head-like structure is positioned via an air-bearing surface over a rotating disk, which comprises the storage media 130 (e.g., phase change storage media).

Further, the heater may be used in a thermally-assisted magnetic recording apparatus as, for example, discussed in U.S. Pat. Nos. 6,233,206 and 6,493,183. The heater is arranged in a magnetic recording head and is used to lower locally the coercivity of the storage media (130 e.g., high coercivity storage media). In addition, in a very similar arrangement the heater 200 may be disposed in a recording head to induce thermal-protrusion, which decreases the distance between heater 200 and storage media 130.

In addition, the assembly 100 includes a controller 140 which may control the heater by adjusting the power to a heater (e.g., to match a target power level), and/or changing a polarity of an electrical current supplied to the heater (e.g., at an appropriate time).

In thermal and/or thermally-assisted information processing and control, reading and/or writing and/or erasing may be realized by heating a storage media with a heater. As explained below, the present invention can be applied not only to all kinds of thermal and/or thermally-assisted information processing and control schemes, but also thermally-induced protrusion control. However, for illustration purposes, the details of the present invention will be discussed herein using the example of thermally-assisted magnetic recording (e.g., TAR).

The present invention offers solutions to the above discussed problems of the conventional controllers and assemblies. First, the invention includes the idea of a resistance variation tolerant constant power mode suitable for thermally-assisted information processing (e.g., thermally-assisted magnetic recording (TAR)) and/or thermal information process and control. In this scheme, the resistance of the heater may be measured (e.g., periodically measured at appropriate times), and the current or the voltage may be adjusted in order to keep the power (e.g., current×voltage) constant.

For example, with increasing resistance, the applied voltage would be increased, which results in a decreased current. Consequently, the power (and thus the temperature) of the heater may be maintained regardless of variation of the resistance of the heater.

Second, recognizing that heater resistance variations are mostly caused by electromigration, the present invention includes the idea of reversing the polarity of the heater current at appropriate times. Appropriate times may be determined by rate of electromigration for a given temperature In short, the inventive assembly may control an energy source (e.g., heater) capable of thermal and/or thermally-assisted information process and control as well as thermal protrusion control. The assembly may include, for example, 1) a heater suitable for information processing (e.g., capable of writing and/or erasing and/or reading information) and 2) a controller, which adjusts the power to the heater to match a target power and/or changes the polarity of the current supplied to the heater (e.g., at appropriate times). Thus, the controller may control the heater in order to inhibit and/or compensate for a variation in electrical resistance in the heater.

Referring again to the drawings, FIG. 1 illustrates the inventive assembly 100 which includes a heater 200 (e.g., a heating element), which may be part of a thermal and/or thermally-assisted information processing apparatus and/or thermal protrusion apparatus. The assembly 100 also includes a controller 140 which may adjust the power to the heater 200 to match a target power and/or change the polarity of the current to the heater 200 (e.g., at appropriate times). Many details of such a heater 200 are described in the above-referenced related patents.

In the inventive assembly 100, the heater 200 can, for example, be used to assist in information processing operations on a magnetic medium, such as writing and/or erasing and/or reading operations. The heater 200 can be operated in the far-field and/or near-field, and can be in contact or non-contact with the media.

Figure 2A:
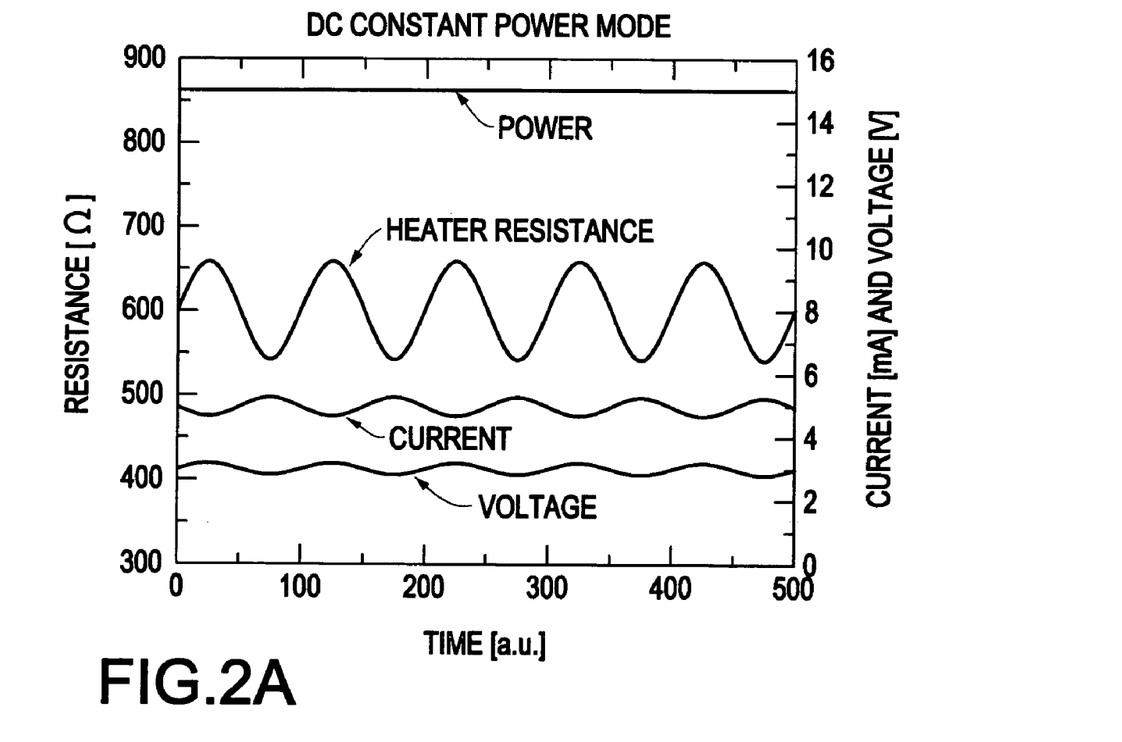
FIG. 2A is a graph plotting resistance as a function of time for a controller DC constant power mode according to the present invention.
Figure 2B:
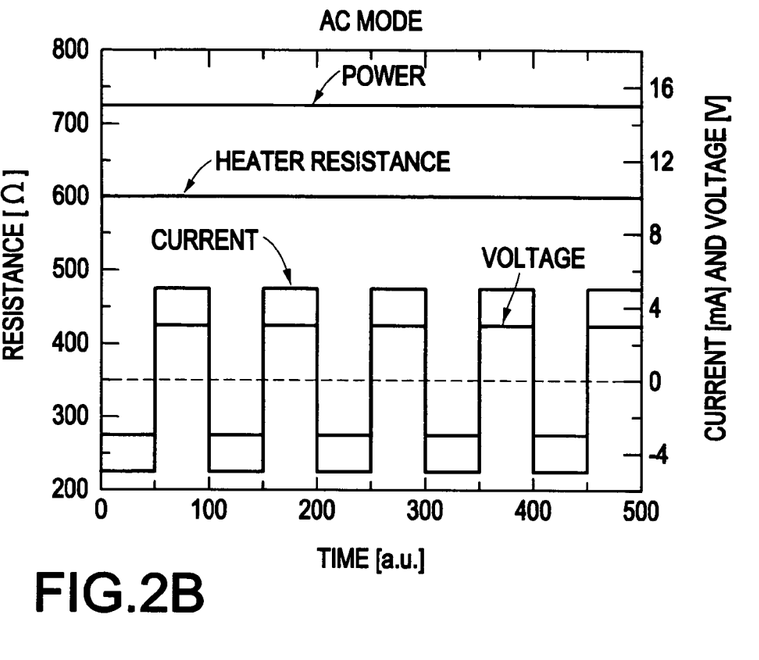
FIG. 2B is a graph plotting resistance as a function of time for a controller AC mode according to the present invention.
Figure 2C:
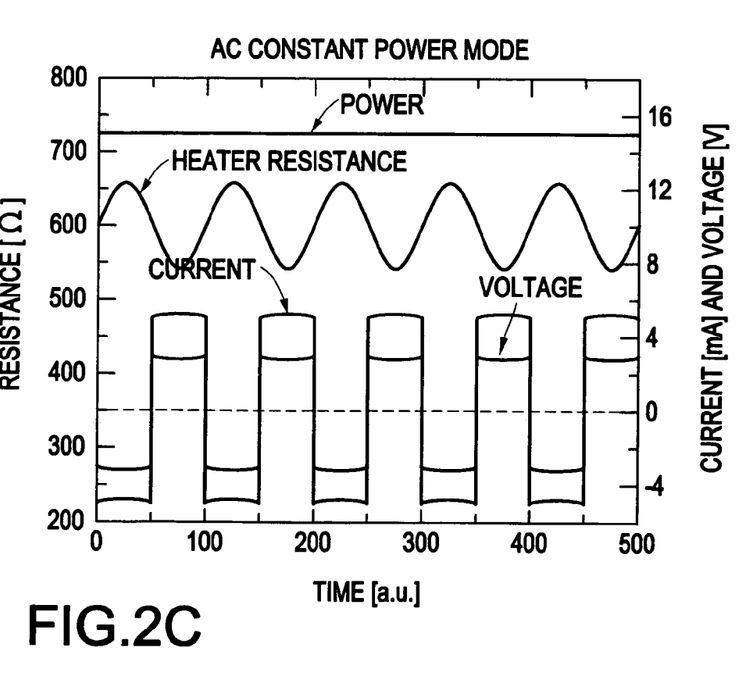
FIG. 2C is a graph plotting resistance as a function of time for a controller AC constant power mode according to the present invention.

FIGS. 2A–2C are graphs which provide illustrative examples of how the controller 140 in the inventive assembly 100 may operate. Specifically, FIGS. 2A–2C illustrate three modes in which the controller 100 may operate. For example, FIG. 2A shows a DC constant power mode, FIG. 2B shows an AC mode, and FIG. 2C shows an AC constant power mode.

For example, as shown in FIG. 2A, in a DC-constant power mode, if the controller 140 regulates the dissipated power and the heater resistance changes, the current or the voltage may be adjusted to maintain the target power. Thus, assuming a small sinusoidal modulation of the heater resistance, the current or the voltage may be measured, and then, based on the measurement, the voltage or current may be adjusted so that power (power=current×voltage) matches the set point (e.g., predetermined set point).

In this mode, the controller 140 may include an adjustable voltage source or current source, and a current sensor or voltage sensor. The set point (e.g., target) power may be determined by the ambient temperature, spin speed, level of heating due to other components in the recording head etc.

Further, as shown in FIG. 2B, in an AC mode, in order to prevent electromigration, the controller 140 may change (e.g., periodically change) the polarity of the applied current or voltage to the heater 200 (e.g., at appropriate times). In some cases (e.g., in magnetic recording) the current may be switched in phase with the current of the write coils, which can assist the magnetic field generated from the coils. In other cases it may be advantageous to modulate the current source at some low frequencies.

However, pick-up in the read signal from the heater voltage or current supply may be a concern. In that situation, it may be preferred that the polarity is switched at the beginning (e.g., only at he beginning) of each write cycle.

As shown in FIG. 2B, the fall and rise time of the voltage or current supply is preferably fast, in order to avoid ripples in the dissipated power (and thus ripples in the resulting temperatures). However, it is important to note that such ripples will be "thermally" low passed by the thermal response of the heater system. As the polarity of the current or voltage is switched, the resulting voltage or current changes its signs which results into a constant power, granted that the heater resistance does not change. As it will be explained in more detail below, this AC mode can drastically reduce heater resistance changes.

Further, as shown in FIG. 2C, in an AC constant power mode (e.g., a combination of constant power and AC-mode) the controller 140 may adjust the power to the heater 200 to match a certain set point as well as change the polarity of the current supplied to the heater 200 (e.g., at appropriate times). While the voltage or current source changes its polarity, the current or voltage across the heater may be measured, and based on the measurement, the voltage or current source may be adjusted in order to match a certain target power.

Figure 3A:
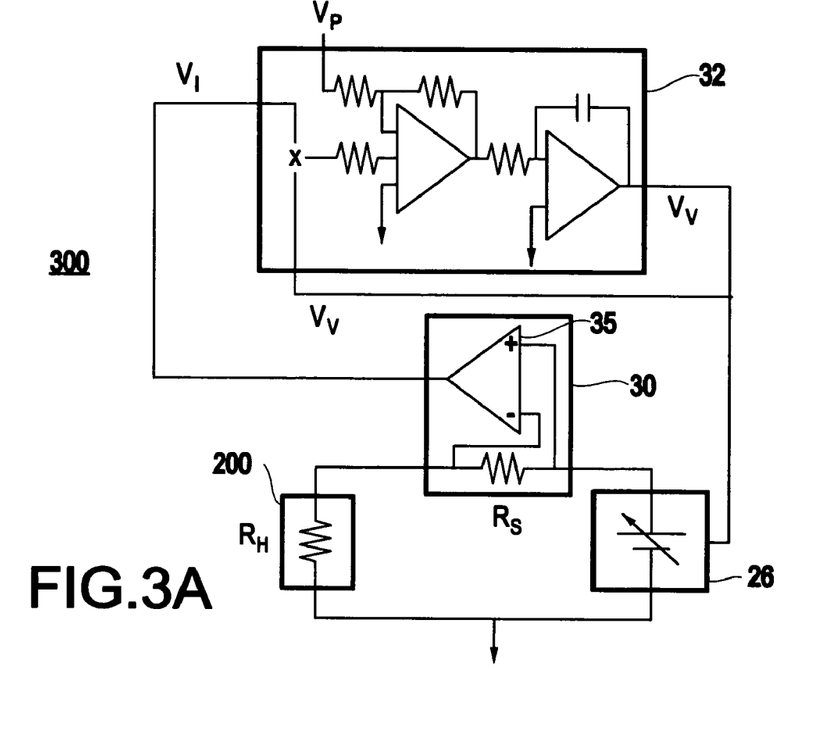
FIG. 3A–3B are schematic circuit diagrams for two examples of a controller according to the present invention.
Figure 3B:
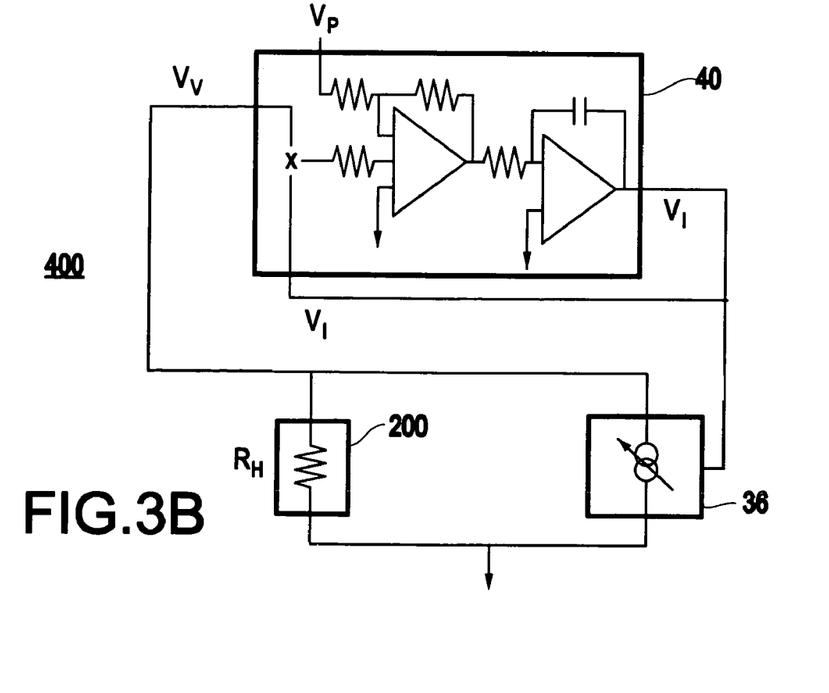

FIGS. 3A–3B provide circuit diagrams for two illustrative controllers (e.g., control circuits) which may be used in the inventive assembly. Specifically, FIGS. 3A–3B illustrate two controllers 300, 400 which are capable of controlling (e.g., actively controlling) the power dissipated in the heater used for thermal and/or thermally-assisted information processing and control.

As shown in FIG. 3A, the controller 300 may include a voltage source 26, current sensor 30, and feedback circuit 32. Specifically, the voltage source 26 (the output of which is controlled with the voltage $V_V$) may supply the power to the heater 200. The heater 200 (e.g., heating element) is represented by a resistor with an electrical resistance $R_H$. In series with resistor $R_H$, a current sensor 30 is arranged. The current sensor 30 may include, for example, a sense resistor $R_S$ and a differential amplifier 35. In addition, the output $V_I$ of the current sensor is fed into a feedback circuit 32 which may include a multiplier, summing amplifier and integrator.

In the feedback circuit 32, $V_I$ is multiplied with $V_V$, which represents a measurement of the power dissipated in the heater 200. The product of $V_I$ and $V_V$ is added in a summing amplifier to a target voltage ($V_P$, the sign of which is inversed), which represents the power set point. An integrator drives its input to zero by adjusting the drive voltage to the voltage-controlled voltage source 26.

The voltage controlled voltage source 26 may include, for example, a voltage-controlled amplifier. Further, the voltage source can be DC or AC. If an AC-source is chosen, the measured current should be rectified.

As shown in FIG. 3B, the controller 400 may be similar to controller 300. However, instead of voltage source, the controller 400 may include a voltage controlled ($V_I$) current source 36. The voltage across the heater 200 is measured (e.g., voltage $V_V$) and multiplied in feedback circuit 40 by $V_I$, to obtain a measurement for the dissipated power.

It should be noted that passive circuits may be useful to control the power into the heater. As the simplest solution, it may be preferred to add a resistor in series which is approximately equal to the heater resistance.

As discussed in U.S. patent application Ser. No. 09/931,834, which is incorporated herein by reference, $V_P$ may be a function of the ambient temperature in order to prevent unnecessary adjacent track heating. While U.S. patent application No. 09/931,834 has been discussed in terms of magnetic recording, adjacent track heating can be concern in other conventional thermal and/or thermally-assisted information processing schemes. For thermal and thermally-assisted information processing applications, where the storage media is part of a rotating disk, $V_P$ may also be a function of the spin speed (e.g., more power needed in the heater with increasing spin speed to maintain a disk temperature). Generally, it may be also preferred to change the setpoint as a function of time (e.g., after the write process has been initialized) in order to compensate for other temperature effects (such as temperature built up).

Figure 3C:
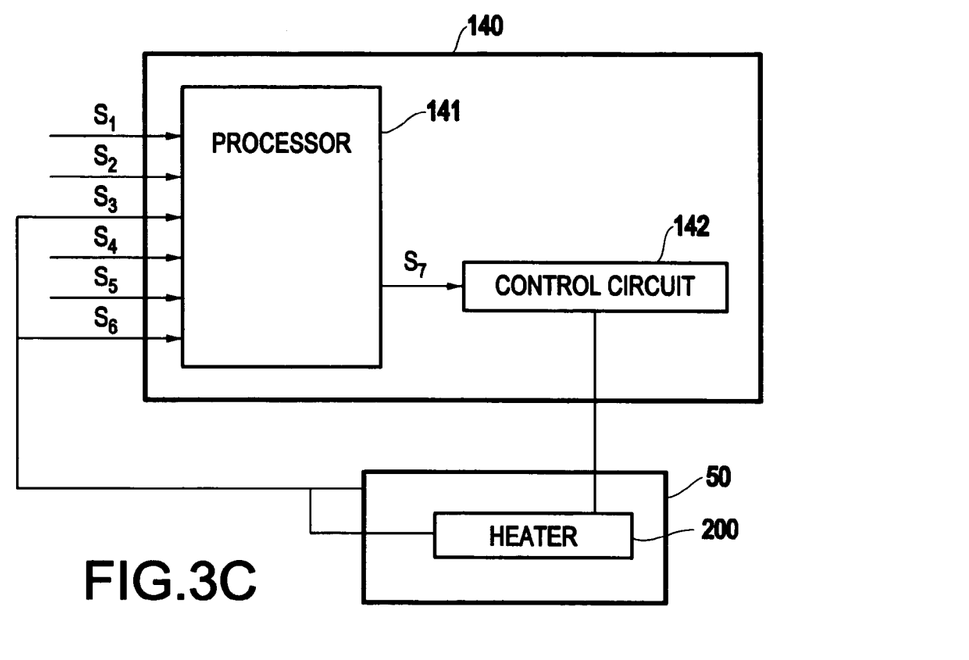
FIG. 3C shows a schematic layout for a controller 140 which may be used in the inventive assembly in accordance with the present invention.

For example, in FIG. 3C a controller 140 is illustrated as it may be preferred in an application where the heater is built into a recording head 50 flying over a disk, which contains the storage media. In this example, the controller 140 includes a processor 141 for determining a target power level ($S_7$) (e.g., $V_P$ in FIGS. 3A–3B), and a control circuit 142. The controller 140 would calculate (e.g., by using look up table) a temperature/power set point as a function of spin speed ($S_1$), ambient temperature ($S_2$), head temperature ($S_3$) and fly height ($S_4$). For example, lowering the spin speed, increase in the ambient temperature, an increase in the head temperature, a reduction in the fly height would typically result into smaller power setpoint.

Typically, one would establish a look up table by systematic experiments. Further, the controller in FIG. 3C may use the heater resistance ($S_6$) to determine the power set point as well as the interval to switch polarity. The heater resistance is a useful gauge to monitor the "health" of the heater. For example, an increase in the heater resistance may result into "faster" polarity changes. Finally, the controller may use information processing commands ($S_5$) in order to anticipate certain heater temperature requirements. For example, after receiving a command initializing a write process the heater may be used to heat to induce protrusion during the seek time (to find a data track).

Figure 4A:
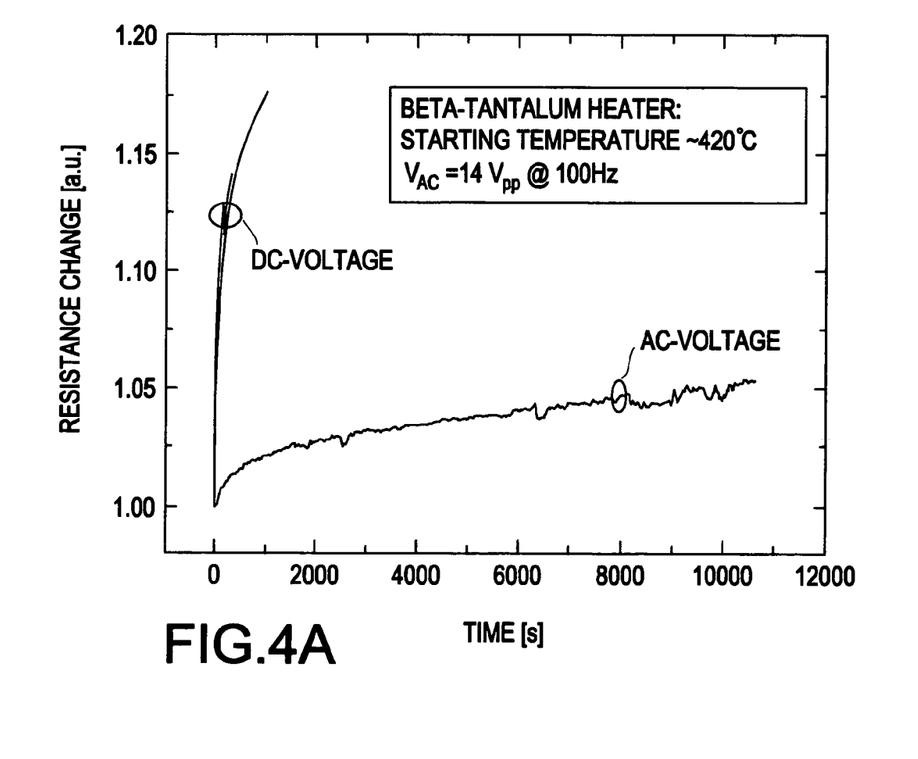
FIGS. 4A–4B are graphs demonstrating the improvements of the present invention over conventional assemblies.
Figure 4B:
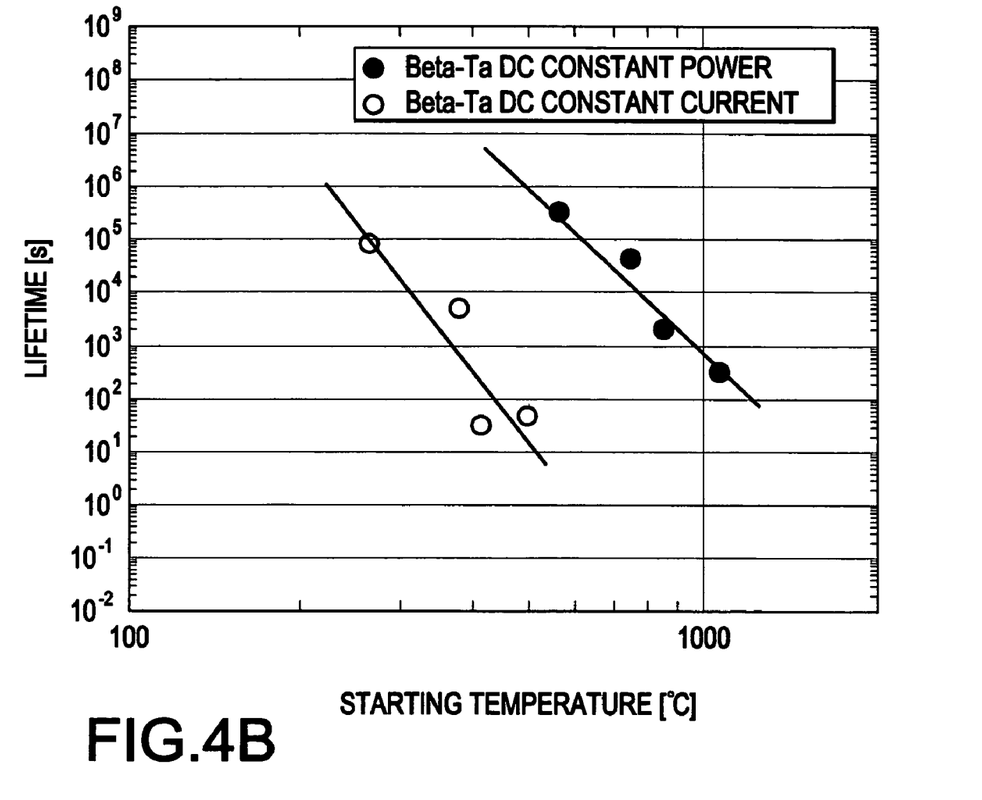

FIGS. 4A–4B provide graphs which illustrate the significant improvements in the heater stability which may be realized by using the present invention. Specifically, FIG. 4A shows the change in DC-resistance as a function of time using the AC-mode and DC-mode for the controller. Specifically, a constant DC and AC-voltage was applied to encapsulated (using 30 nm alumina) beta-Ta heaters (made via photolithography, 10 μm long, 0.6 μm wide, and 0.04 μm thick) and the "altering" (e.g., irreversible altering) of the heater resistance was compared. The starting temperature was about 420° C.

As the data in FIG. 4A clearly demonstrates, the AC-mode improves drastically the stability of the heater resistance. Detailed scanning electron microscopy (SEM) studies indicate electro-migration effects for the heater, which has been operated in the DC-mode. By way of comparison, SEM pictures do not show evidence for electro-migration effects for heaters, which have been operated in the AC-mode.

In FIG. 4B, the lifetime of the heaters is plotted vs. operating (e.g., starting) temperature using the constant power mode (e.g., DC constant power mode) in comparison to a constant current mode (e.g., DC constant current mode).

The feedback for the constant power mode has been realized digitally. As the data in FIG. 4B indicates, the heater stability is improved by 5–6 orders of magnitudes by using the present invention. It should be noted the improvement from the constant power mode will be dependent on the contribution of the lead resistance to the heater.

Figure 5:
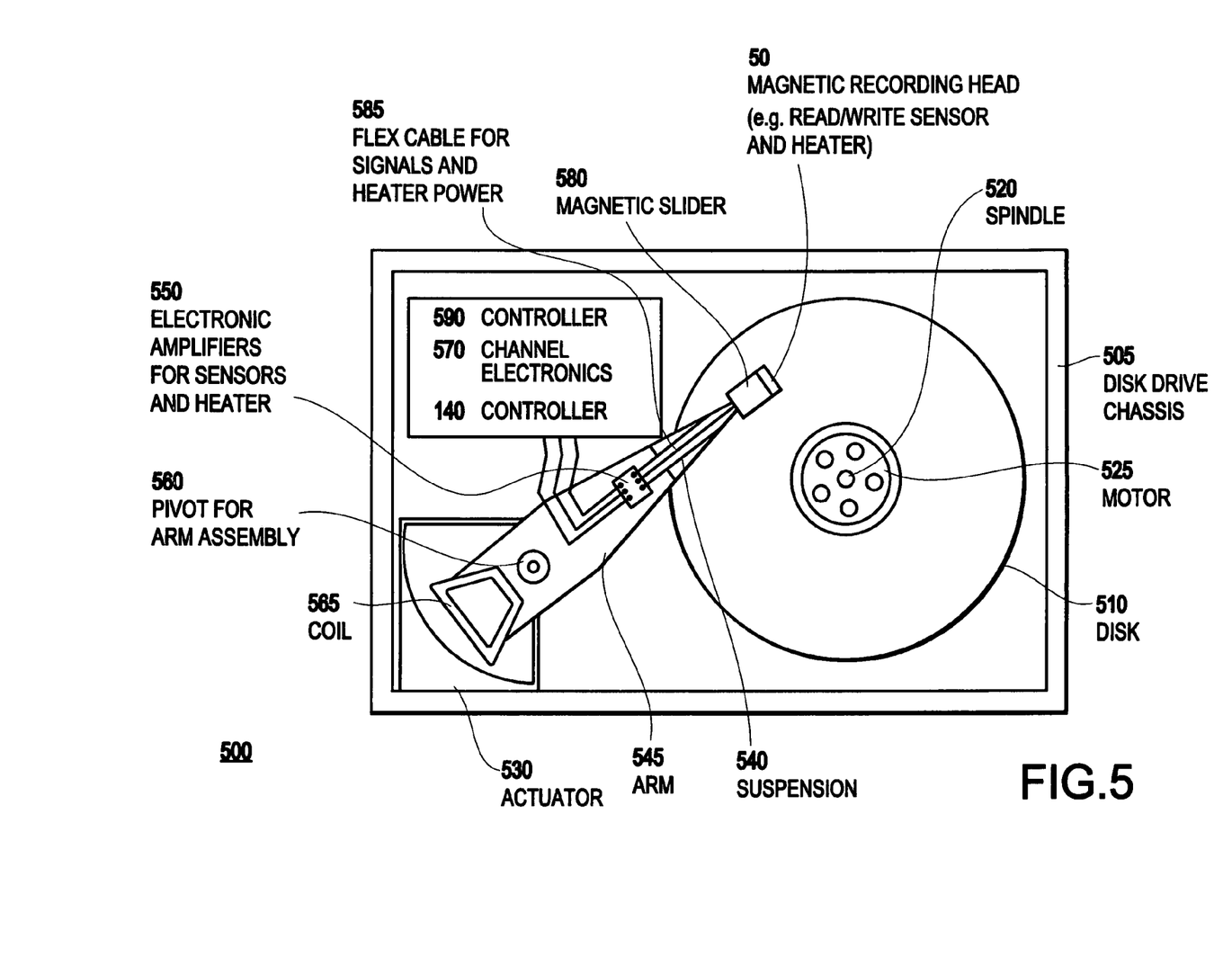
FIG. 5 illustrates a recording/reproducing apparatus (e.g., hard disk drive) 500 including the inventive assembly 100 according to the present invention.

As shown in FIG. 5, the present invention also includes an inventive hard disk drive (e.g., magnetic recording/reproducing apparatus) 500 which includes the inventive assembly 100 for thermally-assisted information processing. The inventive disk drive 500 may include a chassis 505 and spindle 520 with a motor 525 for rotating a magnetic disk 510. Further, the arm 545 (e.g., including suspension 540) in the disk drive 500 may include a magnetic slider 580 with the inventive magnetic recording head. The inventive disk drive 500 may also include an actuator 530, pivot 560 for the arm assembly and a coil 565.

The suspension arm 545 may be used to selectively locate the inventive magnetic recording head over the magnetic disk 510, for reading data from the magnetic disk 510, and writing data (e.g., using thermally-assisted recording) to the magnetic disk 510. The hard disk drive 500 may further include at least one amplifier 550 for read and write data processing as well as a controller 590 for controlling the hard disk drive.

Further the hard disk drive 500 may include channel electronics 570 for data communication. In addition, flex cable 585 may be used to transmit signals (e.g., to/from the inventive magnetic recording head) and provide power to the heating device.

Further, such information processing operations may be thermally-assisted and/or thermal (e.g., by thermally-induced protrusion (TIP) or thermally-assisted recording (TAR), etc.) by the use of the inventive assembly 100 (e.g., the controller 140 controlling the heater 200 by adjusting the power supply to the heater 200 to match a target power level, and/or changing a polarity of an electrical current supplied to the heater.

Figure 6:
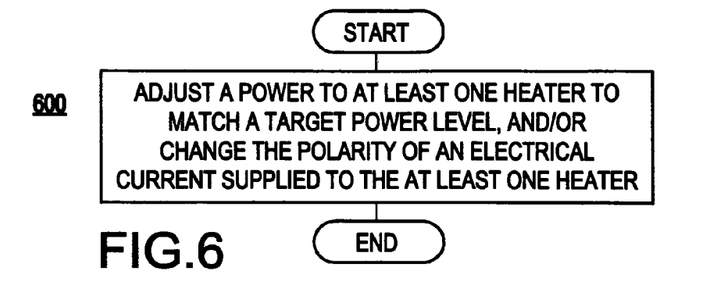
FIG. 6 illustrates an inventive method 600 for controlling at least one heater in an information processing assembly according to the present invention.

Referring again to the drawings, FIG. 6 illustrates an inventive method of controlling at least one heater in an information processing method 600. As shown in FIG. 6, the inventive method 600 includes at least one of adjusting (610) a power to the at least one heater to match a target power level, and changing (620) the polarity of an electrical current supplied to the at least one heater.

Figure 7:
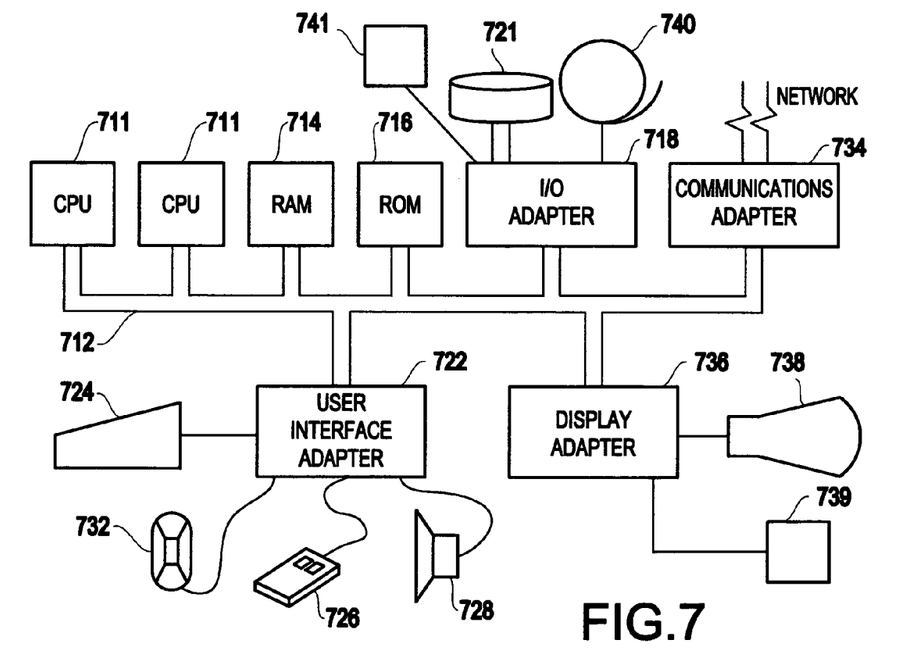
FIG. 7 illustrates a typical hardware configuration which may be used for implementing the inventive assembly 100 and method 600 according to the present invention.

Referring now to FIG. 7, system 700 is an example of a typical hardware configuration which may be used for implementing the inventive assembly 100 and method 600. The configuration has preferably at least one processor or central processing unit (CPU) 711. The CPUs 711 are interconnected via a system bus 712 to a random access memory (RAM) 714, read-only memory (ROM) 716, input/output (I/O) adapter 718 (for connecting peripheral devices such as disk units 721 and tape drives 740 to the bus 712), user interface adapter 722 (for connecting a keyboard 724, mouse 726, speaker 728, microphone 732, and/or other user interface device to the bus 712), a communication adapter 734 for connecting an information handling system to a data processing network, the Internet, and Intranet, a personal area network (PAN), etc., and a display adapter 736 for connecting the bus 712 to a display device 738 and/or printer 739. Further, an automated reader/scanner 741 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing media tangibly embodying a program of machine-readable instructions executable by a digital data processor to perform the above method.

Such a method may be implemented, for example, by operating the CPU 711 to execute a sequence of machine-readable instructions. These instructions may reside in various types of signal bearing media.

Thus, this aspect of the present invention is directed to a programmed product, comprising signal-bearing media tangibly embodying a program of machine-readable instructions executable by a digital data processor incorporating the CPU 711 and hardware above, to perform the method of the invention.

Figure 8:
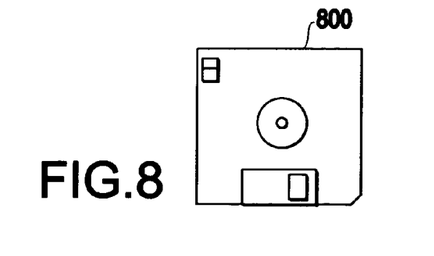
FIG. 8 illustrates a programmable medium that may be used to store instructions for performing the inventive method 600.

This signal-bearing media may include, for example, a RAM contained within the CPU 711, as represented by the fast-access storage for example. Alternatively, the instructions may be contained in another signal-bearing media, such as a magnetic data storage diskette 800 (e.g., see FIG. 8), directly or indirectly accessible by the CPU 711.

Whether contained in the computer server/CPU 711, or elsewhere, the instructions may be stored on a variety of machine-readable data storage media, such as DASD storage (e.g, a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, complied from a language such as "C" etc.

With its unique and novel features, the present invention provides an effective assembly for thermal and/or thermally-assisted information processing (e.g., thermally-assisted recording (TAR) and thermally-induced protrusion (TIP)) which may minimize heater resistance changes and control the power dissipated in the heater and thus control the temperature of the heater.

While the invention has been described in terms of preferred embodiments, those skilled in the art will recognize that the invention can be practiced with modification within the spirit and scope of the appended claims.

Further, Applicant's intent is to encompass the equivalents of all claim elements, and no amendment to any claim the present application should be construed as a disclaimer of any interest in or right to an equivalent of any element or feature of the amended claim.

What is claimed is:

1. An information processing assembly, comprising:
   at least one heater suitable for information processing; and
   a controller for controlling said at least one heater by changing a polarity of at least one of an electrical current and a voltage supplied to said at least one heater, and said polarity is changed by said controller at an appropriate time that is determined by a rate of electro-migration.

2. The assembly according to claim 1, wherein the controller controls said at least one heater by by at least one of inhibiting and compensating for a variation in electrical resistance in said at least one heater to maintain a constant power to said at least one heater.

3. The assembly according to claim 1, wherein said controller adjusts at least one of a current and a voltage applied to said at least one heater to maintain the constant power to said at least one heater.

4. The assembly according to claim 1, wherein said variation in electrical resistance comprises one of an electro-migration-induced variation, a chemically-induced variation, and a change in a grain structure of a material in said at least one heater.

5. The assembly according to claim 1, further comprising:
a storage medium having at least one of a programmable thermal impedance and a programmable electrical impedance,
wherein thermal energy from said at least one heater programs said at least one of said programmable thermal impedance and said programmable electrical impedance.

6. The assembly according to claim 5, wherein said power to said at least one heater is adjusted to match a target power level which is determined by one of whether information is read, erased or written, a value to which said at least one of said programmable thermal impedance and said programmable electrical impedance is programmed, and a storage medium temperature.

7. The assembly according to claim 1, wherein said controller comprises at least one of a resistor having a resistance which is substantially equal to a resistance of said at least one heater, an analog feedback loop, and a digital feedback loop.

8. The assembly according to claim 1, further comprising:
a head structure, said at least one heater being disposed in said head structure.

9. The assembly according to claim 1, further comprising:
a magnetic recording head for processing information on a magnetic recording medium, said at least one heater being disposed in said magnetic recording head.

10. The assembly according to claim 9, wherein thermal energy from said at least one heater at least one of induces a thermal protrusion in said magnetic recording head, and heats said magnetic recording medium.

11. The assembly according to claim 9, wherein said at least one heater comprises a first heater for inducing a thermal protrusion in said magnetic recording head and a second heater for heating said magnetic recording medium.

12. The assembly according to claim 9, wherein said target power level is based on at least one of a temperature of said magnetic recording medium, a fly height between said magnetic recording head and said magnetic recording medium, and a spin speed of said magnetic recording medium.

13. The assembly according to claim 9, wherein said magnetic recording head further comprises a write coil.

14. The assembly according to claim 13, wherein said target power level is based on a heating from said write coil.

15. The assembly according to claim 2, wherein a change in said polarity is synchronized with a write coil current in a magnetic recording head.

16. A controller for controlling at least one heater in an information processing assembly, said controller comprising:
an input for receiving a signal comprising information for adjusting a power to said at least one heater to match a target power level, wherein said information comprises a spin speed of a storage medium, a temperature of a recording head, and a fly height between said recording head and said storage medium.

17. The controller according to claim 16, further comprising:
a processor which includes said input; and
a control circuit which receives a signal from said processor.

18. The controller according to claim 16, wherein said information comprises at least one of ambient temperature, an information processing command, and a heater resistance of said at least one heater.

19. The controller according to claim 17, wherein said control circuit comprises a voltage source for supplying power to said at least one heater, a current sensor coupled to said voltage source, and a feedback circuit.

20. The controller according to claim 17, wherein said control circuit comprises a current source for supplying power to said at least one heater, a voltage sensor coupled to said current source, and a feedback circuit.

21. A method of controlling at least one heater in an information processing assembly, said method comprising:
adjusting a power to said at least one heater to match a target power level; and
changing a polarity of at least one of a current and a voltage supplied to said at least one heater, wherein said polarity is changed at an appropriate time that is determined by a rate of electro-migration.

22. A disk drive comprising:
the assembly according to claim 1;
a spindle for rotating a magnetic disk; and
an arm comprising said read/write head, for selectively locating said read/write head over said magnetic disk, said at least one heater being formed in said read/write head.

23. A programmable storage medium tangibly embodying a program of machine-readable instructions executable by a digital processing apparatus to perform a method of controlling at least one heater in an information processing assembly, the method comprising:
changing a polarity of at least one of a current and a voltage supplied to said at least one heater, wherein said polarity is changed at an appropriate time that is determined by a rate of electro-migration.

24. The programmable storage medium according to claim 23, wherein the method further comprises adjusting at least one of a current and a voltage applied to said at least one heater to maintain a constant power to said at least one heater.

* * * * *